United States Patent
Oh

(10) Patent No.: US 8,069,284 B2
(45) Date of Patent: Nov. 29, 2011

(54) SEMICONDUCTOR MEMORY DEVICE, MEMORY SYSTEM AND DATA RECOVERY METHODS THEREOF

(75) Inventor: Sang-Jin Oh, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 23 days.

(21) Appl. No.: 12/453,589

(22) Filed: May 15, 2009

(65) Prior Publication Data

US 2009/0292839 A1 Nov. 26, 2009

(30) Foreign Application Priority Data

May 22, 2008 (KR) .............................. 2008-0047617

(51) Int. Cl.
*G06F 13/00* (2006.01)
*G06F 3/00* (2006.01)

(52) U.S. Cl. .................... 710/52; 710/5; 710/8; 710/15; 710/33

(58) Field of Classification Search ........................ None
See application file for complete search history.

(56) References Cited

U.S. PATENT DOCUMENTS

| 2005/0055531 | A1 | 3/2005 | Asami et al. | |
| 2007/0094440 | A1* | 4/2007 | Torabi | 711/103 |
| 2007/0268754 | A1* | 11/2007 | Lee et al. | 365/185.29 |

FOREIGN PATENT DOCUMENTS

| JP | 06-301586 A | 10/1994 |
| JP | 2005-085011 A | 3/2005 |
| KR | 10-2003-0010987 A | 2/2003 |
| KR | 10-2005-0026330 A | 3/2005 |

OTHER PUBLICATIONS

Kuo, Tei-Wei, Implementation and Challenging Issues of Flash Memory Storage Systems, Mar. 29, 2007 [online, accessed on Dec. 5, 2010], National Taiwan University, URL: http://rtns07.irisa.fr/fichiers/RTNS2007-keynote.pdf.*

* cited by examiner

*Primary Examiner* — Tariq Hafiz
*Assistant Examiner* — Scott Sun
(74) *Attorney, Agent, or Firm* — Volentine & Whitt, PLLC

(57) ABSTRACT

A semiconductor memory device includes a nonvolatile memory device having a plurality of physical sectors, and a memory controller configured to translate a logical address received from a host to a physical address, with reference to mapping data that defines a correspondence between the logical address and the physical address. The nonvolatile memory device is configured to access a first physical sector corresponding to the physical address, and, when a data delete command is provided from the host to the memory controller to delete first data that is stored in the first physical sector, the memory controller delays an erase and/or merge operation for the first physical sector in which the first data is stored.

21 Claims, 13 Drawing Sheets

| LSN | PSN | Valid or Invalid |
|---|---|---|
| 1 | 1 | Valid |
| 2 | 2 | Valid |
| 3 | 3 | Valid |
| 4 | 4 | Valid |
| ... | ... | ... |
| 10 | 10 | Valid |

↑ Deletion (b)

| LSN | PSN | Valid or Invalid |
|---|---|---|
| 1 | 1 | Invalid |
| 2 | 2 | Invalid |
| 3 | 3 | Invalid |
| 4 | 4 | Invalid |
| ... | ... | ... |
| 10 | 10 | Invalid |

SEMICONDUCTOR MEMORY DEVICE, MEMORY SYSTEM AND DATA RECOVERY METHODS THEREOF

BACKGROUND

1. Field

Embodiments relate to a semiconductor memory device, a memory system, and a method of recovering erased data.

2. Description of the Related Art

Storage devices are used to store data, for example, text, voice and images. Semiconductor memory devices, e.g., volatile and non-volatile memory devices, may be used for such storage devices.

A flash memory device is a type of the non-volatile memory device. A demand for the flash memory device is increasing as the computer system is shifted into mobile domain. The flash memory device has advantages of low power consumption, high integration, smaller size and lighter weight. Recently, as portable information applications such as mobile phone, PDA, and digital camera are increasing, flash memory devices are used widely as storage devices instead of hard disks.

Flash memory does not support the same type of overwrite function that hard disks do. Accordingly, it may be necessary to conduct an erase operation in order to program data in the flash memory. Generally, a very long time is required to conduct the erase operation of the flash memory as compared to a program operation. Also, as the erase unit (block) of the flash memory is much larger than a program unit (page), a portion of data that is not to be erased may be in a same block as data to be erased.

The data stored in the hard disk or the semiconductor memory device may be erased by command of the user. In general, erasing of the data is performed in order to increase storage capacity of the hard disk or the semiconductor memory device. However, there occur cases where the erased data should be recovered. For example, the data may be accidentally erased by the user.

Typically, an erase operation is performed by the file system (e.g. FAT). The file system supplies an erase command to the hard disk and/or the semiconductor memory device. However, after the erase command is issued, the user may desire to recover the erased data.

SUMMARY

Embodiments are therefore directed to a semiconductor memory device, a memory system, and a method of recovering erased data, which substantially overcome one or more of the problems due to the limitations and disadvantages of the related art.

It is therefore a feature of an embodiment to provide a data recovery method that delays invalidation of mapping data that corresponds to erased data.

It is therefore another feature of an embodiment to provide a data recovery method that controls erase and/or merge operations on invalidated physical sector corresponding to erased data.

At least one of the above and other features and advantages may be realized by providing a semiconductor memory device, including a nonvolatile memory device having a plurality of physical sectors, a memory controller configured to translate a logical address received from a host to a physical address, with reference to mapping data that defines a correspondence between the logical address and the physical address. The nonvolatile memory device may be configured to access a first physical sector corresponding to the physical address, and, when a data delete command is provided from the host to the memory controller to delete first data that is stored in the first physical sector, the memory controller may delay an erase and/or merge operation for the first physical sector in which the first data is stored.

The memory controller may delay the erase and/or merge operation for the first physical sector in which the first data is stored by registering mapping data corresponding to the first data in a first buffer, and the memory controller may prevent invalidation of the mapping data corresponding to the first data while the mapping data corresponding to the first data is registered in the first buffer.

When a data recovery command instructs the memory controller to attempt to recover the first data, the memory controller may cancel registration of the mapping data corresponding to the first data from the first buffer.

The first buffer may operate in a first-in-first-out (FIFO) order, and the memory controller may recover the first data while the mapping data corresponding to the first data is registered in the first buffer.

The memory controller may delay the erase and/or merge operation for the first physical sector in which the first data is stored by registering invalidated mapping data corresponding to the first data in a second buffer, and the memory controller may prevent the erase operation and prevent the merge operation for the first physical sector in which the first data is stored while the invalidated mapping data corresponding to the first data is registered in the second buffer.

When a data recovery command instructs the memory controller to attempt to recover the first data while the invalidated mapping data corresponding to the first data is registered in the second buffer, the memory controller may validate the invalidated mapping data corresponding to the first data.

When the data recovery command instructs the memory controller to attempt to recover the first data while the invalidated mapping data corresponding to the first data is registered in the second buffer, the memory controller may also cancel registration of the invalidated mapping data corresponding to the first data from the second buffer.

The second buffer operates in first-in-first-out (FIFO) order.

The memory controller may include a first buffer configured to register mapping data corresponding to the first data, and a second buffer configured to register invalidated mapping data corresponding to the first data. The memory controller may prevent invalidation of the mapping data corresponding to the first data while the mapping data corresponding to the first data registered in the first buffer, and the memory controller may prevent the merge operation and prevent the erase operation for a first physical sector in which the first data is stored while the invalidated mapping data corresponding to the first data is registered in the second buffer.

When a data recovery command instructs the memory controller to attempt to recover data, the memory controller may detect whether the mapping data corresponding to the first data is registered in the first buffer and/or detects whether the invalidated mapping data corresponding to the first data is registered in the second buffer.

When the memory controller detects mapping data corresponding to the first data in the first buffer in response to the data recovery command, the memory controller may cancel registration of the mapping data corresponding to the first data from the first buffer.

The first buffer may operate in first-in-first-out (FIFO) method.

When the memory controller detects invalidated mapping data corresponding to the first data in the second buffer in response to the data recovery command, the memory controller may validate the invalidated mapping data corresponding to the first data to be recovered.

When the memory controller detects invalidated mapping data corresponding to the first data in the second buffer in response to the data recovery command, the memory controller may also cancel registration of the mapping data corresponding to the first data from the second buffer.

The second buffer may operate in first-in-first-out (FIFO) order.

At least one of the above and other features and advantages may also be realized by providing a method of managing data for a semiconductor memory device having a nonvolatile memory device with a plurality of physical sectors and a memory controller, the method including translating a logical address into a physical address in the memory controller, with reference to mapping data that defines a correspondence between the logical address and the physical address, accessing in the nonvolatile memory device a first physical sector corresponding to the physical address, and when a data delete command is provided from a host to the memory controller to delete first data that is stored in the first physical sector, using the memory controller to delay an erase and/or merge operation for the first physical sector in which the first data is stored.

Delaying the erase and/or merge operation may include registering mapping data corresponding to the first data in a first buffer, and may prevent invalidation of the mapping data corresponding to the first data while the mapping data corresponding to the first data is registered in the first buffer.

The method may further include cancelling registration of the mapping data corresponding to the first data from the first buffer when a data recovery command instructs the memory controller to attempt to recover the first data.

The method may further include invalidating mapping data corresponding to the first data in response to the data delete command, and delaying the erase and/or merge operation may include registering the invalidated mapping data corresponding to the first data in a second buffer, and may prevent the merge operation and prevent the erase operation for the first physical sector in which the first data is stored while the invalidated mapping data corresponding to the first data is registered in the second buffer.

The method may further include receiving a data recovery command from the host while the invalidated mapping data corresponding to the first data is registered in the second buffer, and then validating the invalidated mapping data corresponding to the first data, and cancelling registration of the invalidated mapping data corresponding to the first data from the second buffer.

At least one of the above and other features and advantages may also be realized by providing a memory system, including an interface configured to transfer data to and/or from the memory system, a CPU configured to process data in the memory system, and a semiconductor memory device configured to store the data. The semiconductor memory device may include a nonvolatile memory device having a plurality of physical sectors, and a memory controller configured to translate a logical address received from the CPU to a physical address, with reference to mapping data that defines a correspondence between the logical address and the physical address. The nonvolatile memory device may be configured to access a first physical sector corresponding to the physical address, and, when a data delete command is provided from the CPU to the memory controller to delete first data that is stored in the first physical sector, the memory controller may delay an erase and/or merge operation for the first physical sector in which the first data is stored.

BRIEF DESCRIPTION OF THE DRAWINGS

The above and other features and advantages will become more apparent to those of ordinary skill in the art by describing in detail exemplary embodiments with reference to the attached drawings, in which:

FIG. 5 illustrates a block diagram of a method in which mapping data corresponding to data to be deleted is invalidated during a data delete operation;

FIG. 6(a) illustrates a mapping table before the merge operation, and FIG. 6(b) illustrates a mapping table after the merge operation;

FIG. 11(a) illustrates the case where only the invalid delay queue is used, and FIG. 11(b) illustrates the case where the invalid delay queue and the merge/erase prevention queue are used together;

DETAILED DESCRIPTION

Figure 1:
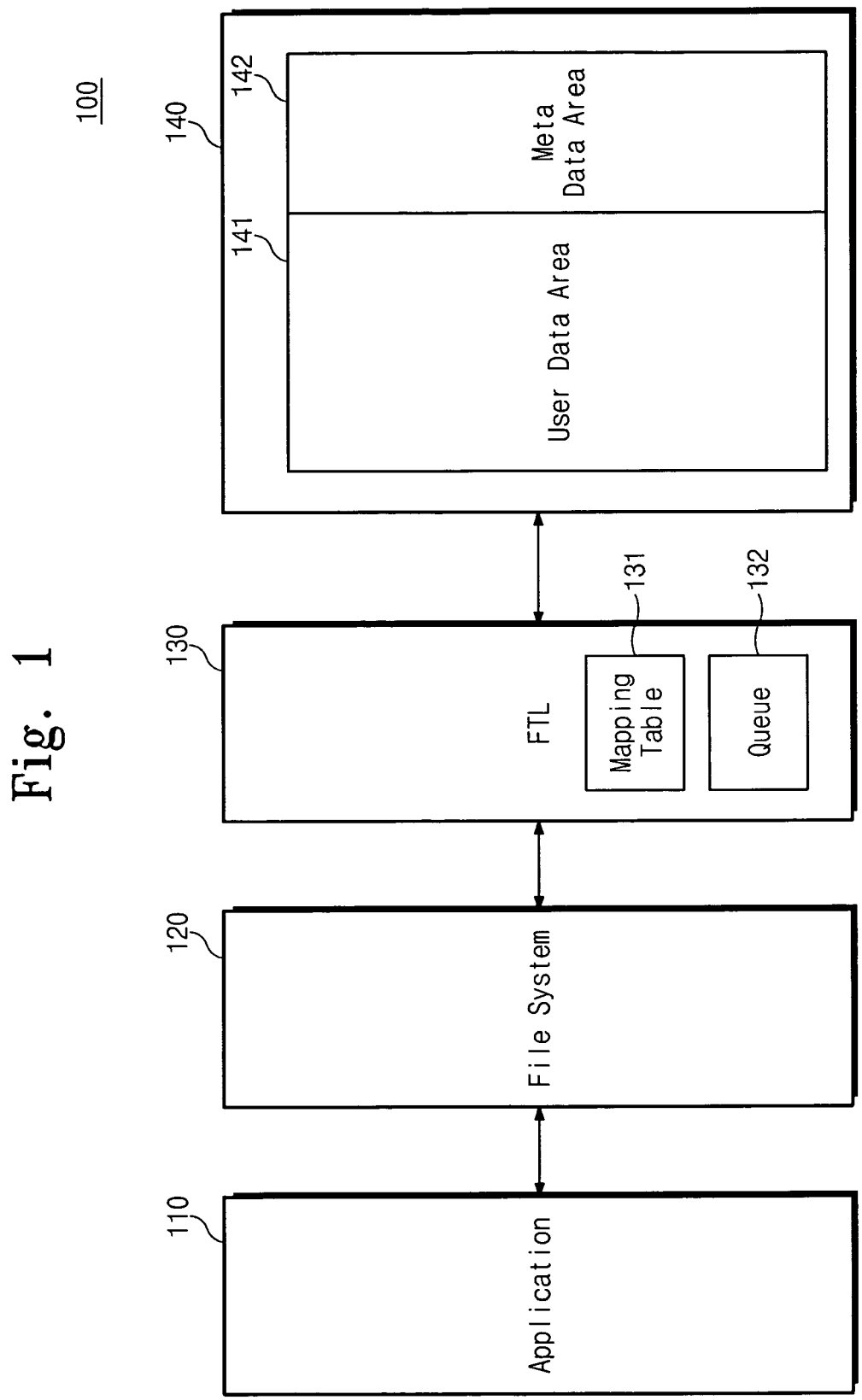
FIG. 1 illustrates a block diagram of a software structure of a memory system according to an embodiment.

Korean Patent Application No. 2008-0047617, filed on May 22, 2008, in the Korean Intellectual Property Office, and entitled: "Semiconductor Memory Device, Memory System and Data Recovery Methods Thereof," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. In the drawing figures, the dimensions of layers and regions may be exaggerated for clarity of illustration. Like reference numerals refer to like elements throughout.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include an $n^{th}$ member, where n is greater than 3, whereas the expression "at least one selected from the group consisting of A, B, and C" does not.

As used herein, the expression "or" is not an "exclusive or" unless it is used in conjunction with the term "either." For example, the expression "A, B, or C" includes A alone; B alone; C alone; both A and B together; both A and C together; both B and C together; and all three of A, B, and C together, whereas the expression "either A, B, or C" means one of A alone, B alone, and C alone, and does not mean any of both A and B together; both A and C together; both B and C together; and all three of A, B, and C together.

Figure 2:
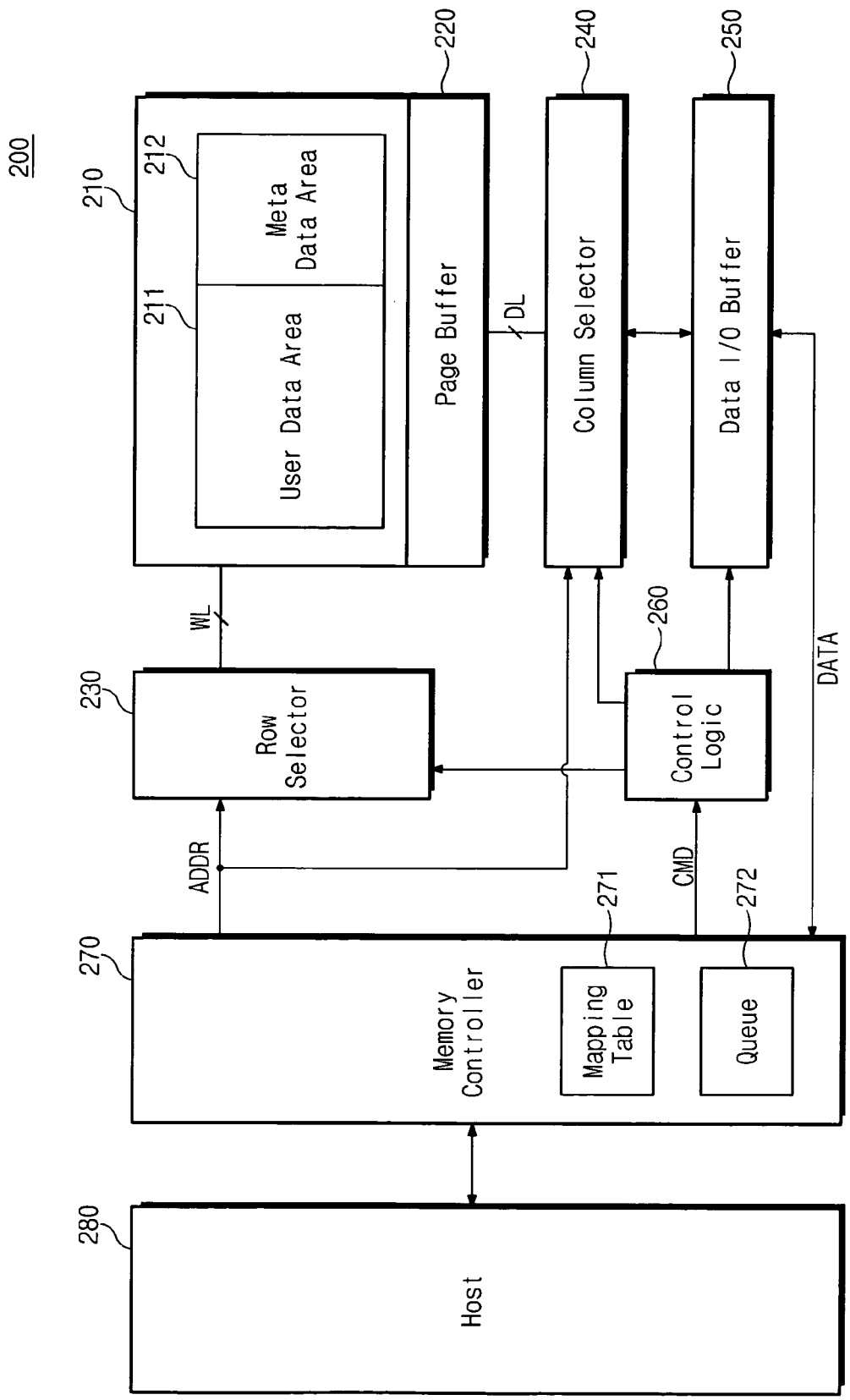
FIG. 2 illustrates a block diagram of a hardware structure of a memory system including a semiconductor memory device according to an embodiment.

FIGS. 1 and 2 illustrate a memory system according to an embodiment as software and hardware diagrams, respectively. In particular, FIG. 1 illustrates a block diagram of a software structure of the memory system, and FIG. 2 illustrates a block diagram of a hardware structure of the memory system including a semiconductor memory device according to an embodiment. The semiconductor memory device may be a flash memory that employs block erase, and each block may include a plurality of physical sectors. Referring to FIG. 1, the memory system may include a file system 120, which may provide file management for an application 110. The memory system may further include a flash translation layer 130 and a flash memory 140. The flash translation layer (FTL) be software, firmware, etc., and may help manage the flash memory. The flash translation layer receives a logical address from a file system, and translates it into a physical address. Here, the logical address may be an address used by the file system, and the physical address may be an address used in the flash memory.

The file system 120 may receive a command from the application 110. The command from the application 110 may include, e.g., a data store command, a data read command, a data move command, a data delete command, a data recover command, etc. The file system 120 may transfer a logical address of data to be processed to the flash translation layer 130.

The flash translation layer 130 may receive the logical address from the file system 120. The flash translation layer 130 may translate the logical address into a physical address. The flash translation layer 130 may make reference to an address mapping table for the address translation. The address mapping table may include a plurality of mapping data, each of the mapping data defining a correspondence relation between logical and physical addresses. The physical address may be supplied to the flash memory 140.

The flash memory 110 may be divided into a meta data area and a user data area. User data, e.g., text, image, and voice data, may be stored in the user data area. Information associated with the user data may be stored in the meta data area. For example, location information of the user data may be stored in the meta data area. The file system 120 may make reference to the meta data area to find the storage location of the user data.

According to an exemplary embodiment, the flash translation layer 130 may include a queue 132. The queue 132 may be a type of buffer that processes data in a first-in-first-out (FIFO) manner, such that data that is input first is output first.

In an implementation, data registered in the queue, i.e., already input to the queue, may be cancelled from the queue prior to being output, as described in detail below. According to an embodiment, the flash translation layer 130 may use the queue 132 to prevent data from being destroyed due to a merge and/or erase operation, as described in detail below with reference to the drawings.

Referring to FIG. 2, a memory system 200 includes a host 280, a memory controller 270, and at least one flash memory device. The flash memory device may include a memory cell array 210, a page buffer 220, a row selector 230, a column selector 240, a data input/output circuit 250, and a control logic 260.

The memory cell array 210 may include a plurality of memory cells. The memory cell array 210 may be divided into a user data area 211 and a meta data area 212. User data such as text, voice and image may be stored in the user data area 211. Meta data associated with the user data may be stored in the meta data area 212. For example, the meta data area 212 may store location information of the user data. The memory cell array 210 may include memory cells arranged in a matrix of rows (word lines) and columns (bit lines). The memory cells may be arranged to have a NAND structure or a NOR structure.

The page buffer 220 may operate as a sense amplifier or a write driver. During a read operation, the page buffer 220 may read data from the memory cell array 210. During a program operation, the page buffer 220 may drive the bit lines with the power voltage or the ground voltage according to data input via the column selector 240, respectively.

The row selector 230 may be connected to the memory cell array 210 via the word lines. The row selector 230 may be controlled by the control logic 260. The row selector 230 may drive a selected row and unselected rows to corresponding word line voltages in response to the row address. For example, during a program operation, the row selector 230 may drive the selected row with a program voltage Vpgm and drive the unselected rows with a pass voltage Vpass, respectively. During a read operation, the row selector 230 may drive the selected row to a read voltage Vread and drive the unselected rows to a pass voltage Vpass, respectively.

The column selector 240 may transfer data from the data input/output buffer 250 to the page buffer 220, or from the page buffer 220 to the data input/output buffer 250, in response to the column address supplied from a column address generator (not shown).

The data input/output buffer 250 may transfer data input from the memory controller 270 to the column selector 240, or the data input/output buffer 250 may transfer data input from the column selector 240 to the memory controller 270.

The control logic 260 may be configured to control the entire operation of the flash memory device. For example, the control logic 260 may be configured to control program, read, and erase operations of the flash memory device.

The memory controller 270 may include a mapping table 271 and a queue 272. The flash translation layer 130 of FIG. 1 may be performed in the form of firmware in the memory controller 270. The mapping table 271 may store relationships setting forth the correspondence between the logical address and the physical address. The mapping table 271 may be used so that the flash translation layer 130 can translate the logical address input from the host 280 into the physical address. The flash translation layer 130 may transfer the physical address to the flash memory device.

The queue 272 may be a type of buffer for storing data according to a first-in-first-out (FIFO) manner, such that data input first in the queue 272 is output first. The size of the queue 272 may be varied according to the particular implementation. According to an embodiment, the queue 272 may be used to delay invalidation of the mapping data, and/or to prevent data loss due to merge and/or erase operations.

According to the above described configuration, the memory system 200 according to an embodiment may be used to recover deleted data. A data recovery method according to an embodiment is described below with reference to the drawings.

Figure 3:
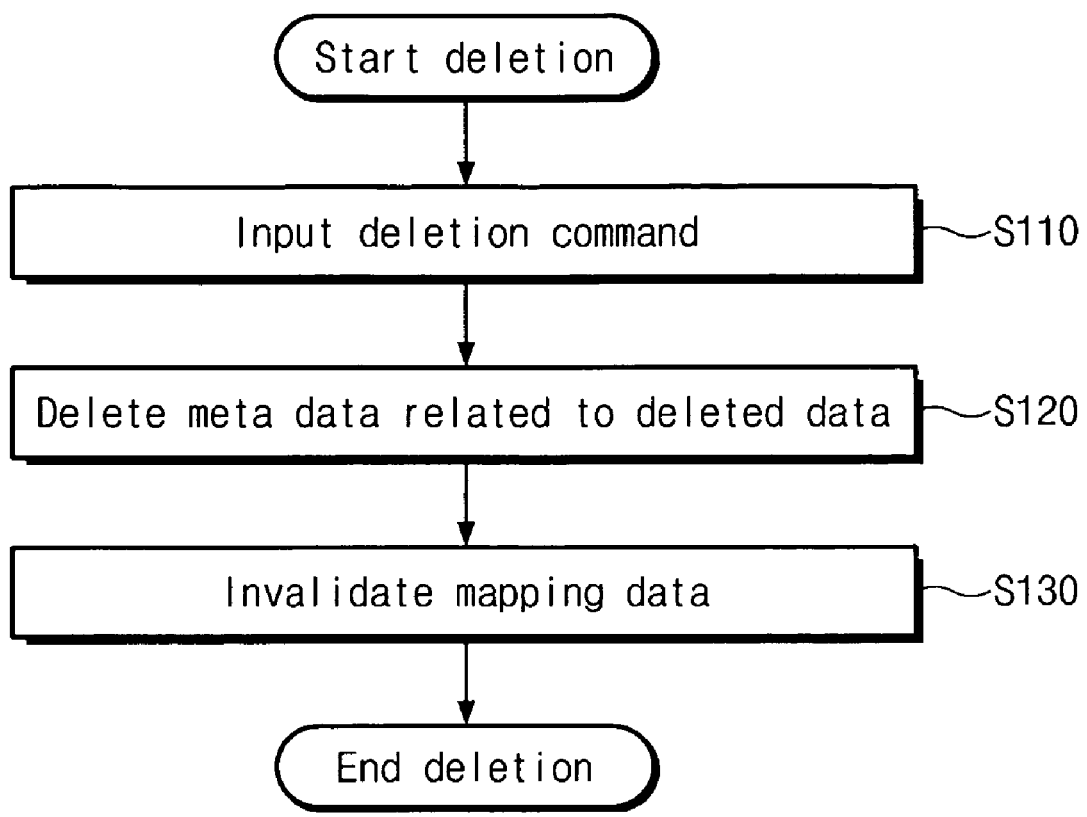
FIG. 3 illustrates a flow chart of a data delete operation.

FIG. 3 illustrates a flow chart of a data delete operation. Referring to FIG. 3, the data erase operation may include three operations S110 to S130. In operation S110, a delete command may be input from the application 110 executing on the host 280 of FIG. 2. In operation S120, the file system 120 deletes the meta data of data to be deleted in response to the delete command. The file system 120 may be performed on the host 280 of FIG. 2, e.g., the file system 120 may be included in the operating system. In operation S130, the flash translation layer 130 invalidates mapping table location(s) corresponding to data to be deleted. The method in which the meta data is deleted and the method in which the mapping data (data to be deleted) is invalidated are described below with reference to the drawings.

Figure 4:
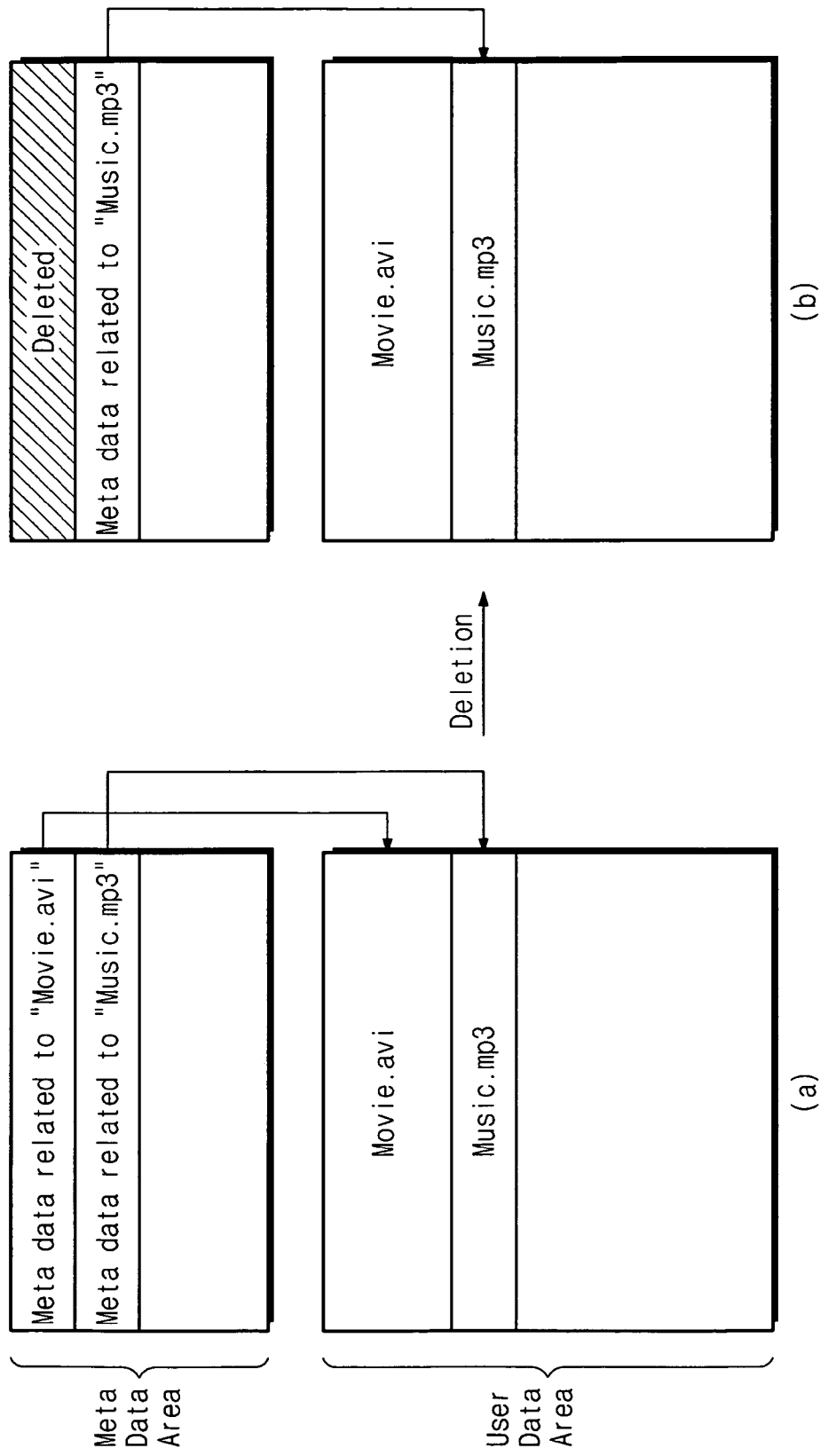
FIG. 4 illustrates a concept map of a method in which meta data is deleted during a data deletion.

FIG. 4 illustrates a concept map of a method in which meta data is deleted during data deletion. FIG. 4(a) is before the meta data is deleted, and FIG. 4(b) is after the meta data is deleted. Referring to FIG. 4(a), user data titled "Movie.avi" and "Music.mp3" are stored in the user data area. The respective meta data corresponding to the user data are stored in the meta data area. The respective meta data may include data regarding the storage location of the user data. Accordingly, the file system 120 may manage user data with reference to the corresponding meta data.

In the case that a command for deletion of the user data titled "Movie.avi" is input from the application 110, the file system 120 may delete only the meta data corresponding to the user data. The file system 120 does not delete the user data at this point. Thus, referring to FIG. 4(b), it can be seen that only meta data is deleted. From the perspective of the file system 120, the user data titled "Movie.avi" is deleted. However, the user data remains in the user data area even after it is deleted, and is managed as described below. As set forth above, only the corresponding relation between the meta data and the user data is destroyed. Therefore, in case the data is to be recovered, the user data may be accessed normally, e.g., if the deleted meta data is recovered.

FIG. 5 illustrates a block diagram of a method in which mapping data corresponding to the data to be deleted is invalidated during a data delete operation. FIG. 5(a) illustrates a mapping table before data deletion, and FIG. 5(b) illustrates the mapping table after data deletion. In the illustrated example, it is assumed that physical sectors PSN 1 to PSN 10 correspond to data to be deleted, i.e., the data to be deleted is stored in the physical sectors PSN 1 to PSN 10. Referring to FIG. 5(a), the flash translation layer 130 matches the logical sector number with the physical sector number with reference to the mapping table 131. For example, the logical sector LSN 1 corresponds to the physical sector PSN 1. Also, the mapping table 131 stores information indicating whether the physical sector is valid. For example, the physical sectors PSN 1 to PSN 10 are designated as valid.

In the case that a delete command for the data is input from the file system 120, the flash translation layer 130 invalidates the mapping data that correspond to the data to be deleted. Referring to FIG. 5(b), it can be seen the physical sectors PSN 1 to PSN 10 are invalidated in the illustrated example. Accordingly, the flash translation layer 130 cannot translate the logical sectors LSN 1 to LSN 10 into physical sectors PSN 1 to PSN 10, respectively. Also, this means that the flash translation layer 130 can allot the physical sectors 1 to 10 to store other data.

Since only the physical sector may be invalidated by a delete operation, data stored in the physical sector is not actually erased at this point. Therefore, the data still exists for a period of time after the delete command is performed. Thus, if recovery for the data is required, the data may be recovered normally, e.g., if the invalidated physical sector is validated, i.e., un-invalidated.

As described above, in the case that the data is deleted, the deletion of the meta data by the file system 120 and the invalidation of the mapping data by the flash translation layer 130 may be performed simultaneously. As a result, the user data may not actually be deleted. Rather, the delete operation may result in deletion of the meta data and invalidation of the mapping data. Accordingly, the user data may be recovered, e.g., by recovering the meta data and validating the mapping data.

When the invalidated physical sector increases, the capacity of the flash memory device decreases. In order to increase the storage capacity, the flash memory device collects valid physical sectors internally, stores data in collected physical sectors in another physical sector, and erases the invalidated physical sectors. This is called a merge operation. The merge operation may result in the loss of data in an invalidate physical sector. Also, the data stored in the physical sector may be lost by a delete command issued from an external source.

Figure 6:
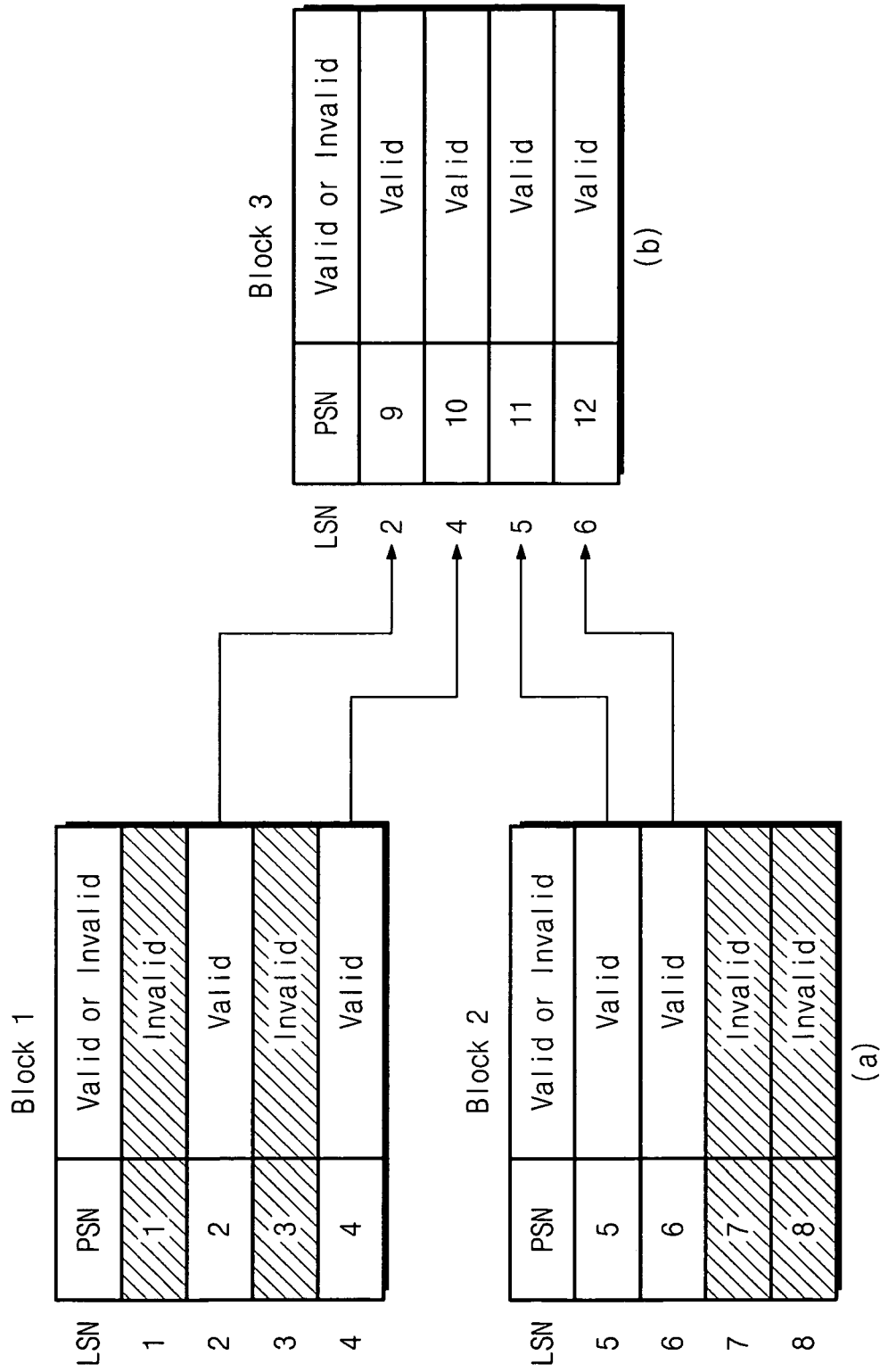
FIGS. 6(a) and 6(b) illustrate concept maps of a merge operation, where

FIG. 6 illustrates a concept map of a merge operation. FIG. 6(a) illustrates a mapping table before the merge operation, and FIG. 6(b) illustrates a mapping table after the merge operation. Referring to FIG. 6(a), in the illustrated example, the first and third physical sectors of the first block Block 1 and the seventh and eighth physical sectors of the second bock Block 2 are assumed to be invalidated. The invalidated blocks are to be merged.

Referring to FIG. 6(b), only valid sectors of Block 1 and Block 2 are stored in Block 3 by the merge operation. Block 1 and Block 2 are then erased. In the case that the physical sector is erased by a merge operation, previously stored data is lost permanently. The erased blocks may be allotted to store other data by the flash translation layer 130.

The merge operation may be performed without interaction with the file system 120. For example, the merge operation may be performed in the background time with no command from the file system 120, in order to improve performance of the system. Accordingly, the invalidated sector is in danger of being erased by a the merge operation at any time. Accordingly, in order to recover the data stored in the physical sector, the merge operation for the physical sector should be controlled to delay data destruction.

The semiconductor memory device according to an embodiment may delay invalidation of mapping data, and/or delay erase and/or merge operations on the invalidated physical sector.

According to embodiments, an invalid delay queue may be used in order to delay invalidation of the mapping data. Physical sectors to be invalidated may be registered sequentially in the invalid delay queue. When the invalid delay queue is full and an additional physical sector is to be registered, the first-registered physical sector may be unregistered in the FIFO sequence. The unregistered physical sector is invalidated. By delaying invalidation of the mapping data according to an embodiment, the data stored in the physical sector may be recoverable for a period of time after the execution of a delete command. The size of the invalid delay queue may be varied according to the particular implementation. For example, if the size of the invalid delay queue is larger, then the invalidation of mapping data may be delayed for a longer period of time. If the size of the invalid delay queue is smaller, then the invalidation of mapping data may be delayed for a shorter period of time.

Figure 7:
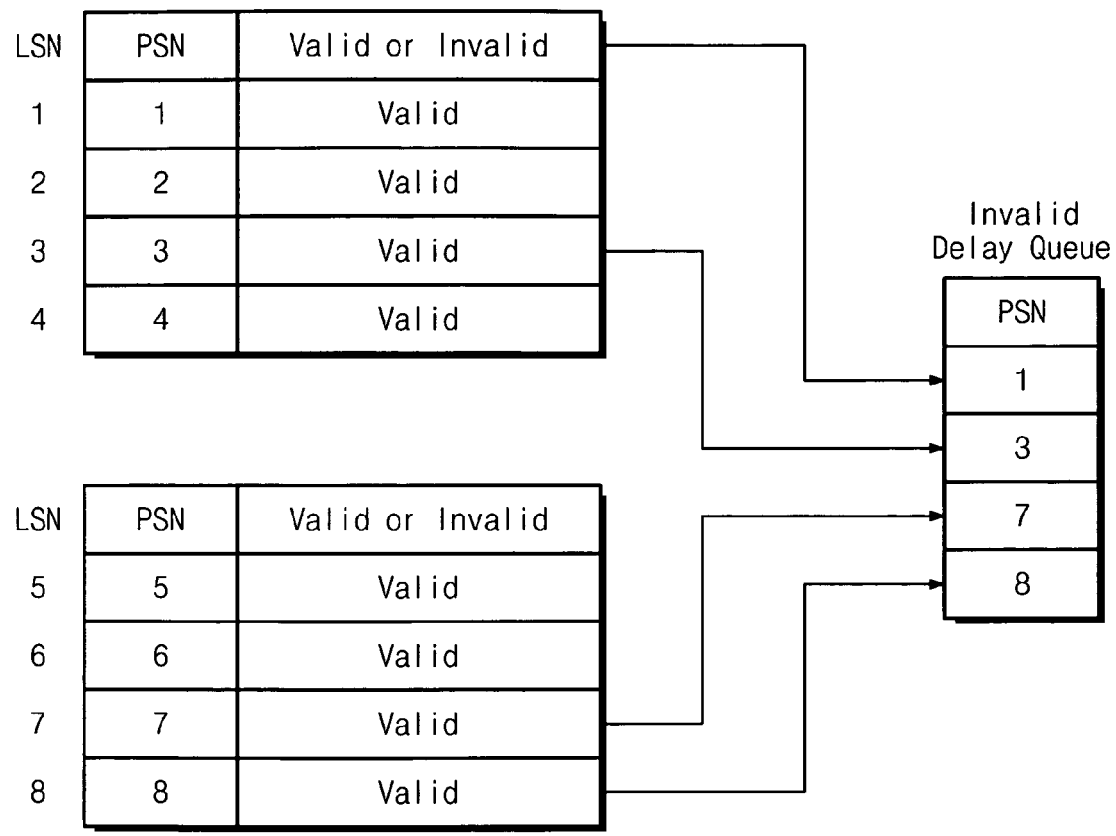
FIG. 7 illustrates a concept map of a management method of an invalid delay queue.

FIG. 7 illustrates a concept map of a management method of an invalid delay queue. Referring to FIG. 7, it is assumed that physical sectors PSN 1, PSN 3, PSN 7, and PSN 8 are invalidated sequentially by a data delete operation in the illustrated example. According to an embodiment, the physical sectors PSN 1, PSN 3, PSN 7, and PSN 8 are not invalidated immediately by a delete operation, but rather are registered in the invalid delay queue. In detail, the physical sector PSN 1 is registered in the invalid delay queue. Here, the invalid delay queue stores not the data stored in the physical sector PSN 1, but only the location of the physical sector. The physical sectors PSN 3, PSN 7, and PSN 8 are registered in the invalid delay queue sequentially in the same way.

The flash translation layer 130 does not invalidate the physical sectors that are registered in the invalid delay queue. Accordingly, the physical sectors PSN 1, PSN 3, PSN 7, and PSN 8 are maintained to be valid while in the invalid delay queue. When the invalid delay queue is full and another physical sector is to be registered therein, the first-registered physical sector PSN 1 is unregistered in the FIFO order. The physical sector that is unregistered from the invalid delay queue is invalidated. After being unregistered from the invalid delay queue, the invalidated physical sector may then be merged or erased.

Figure 8:
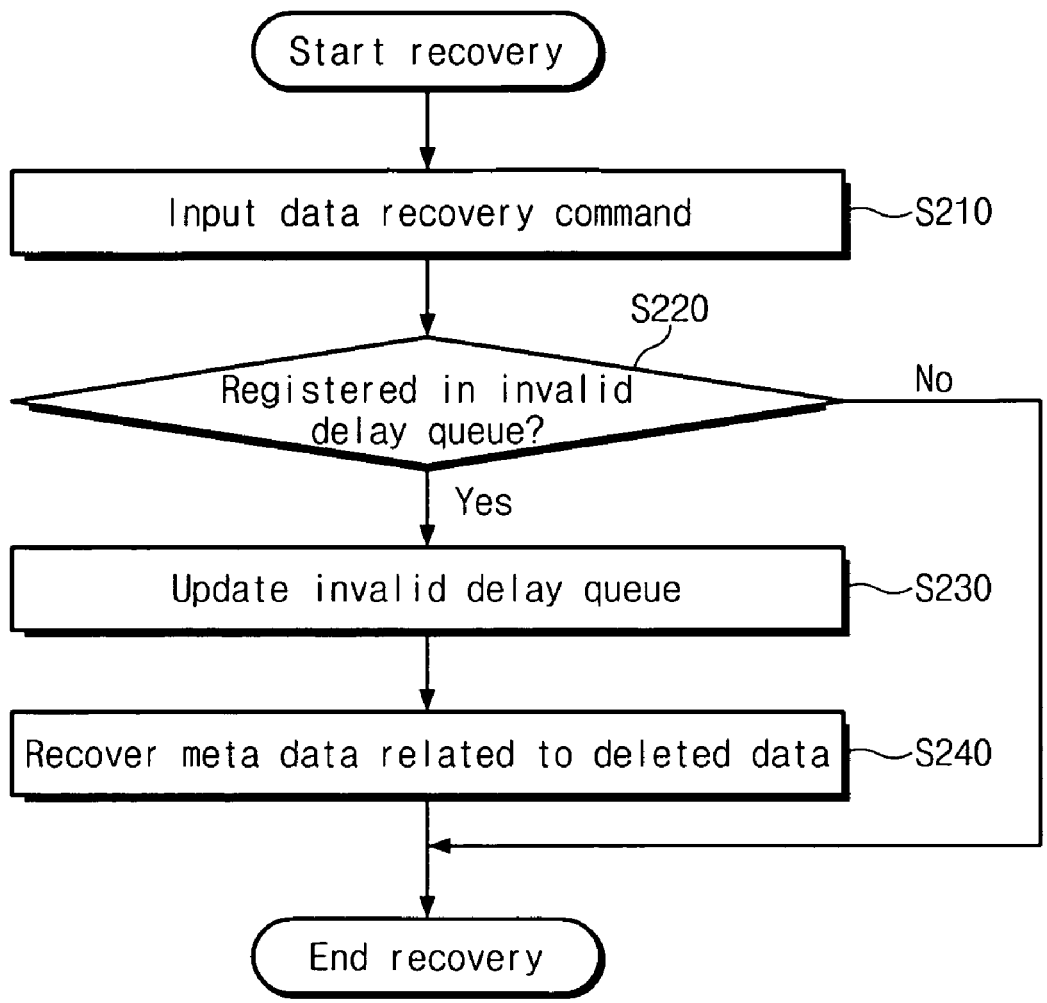
FIG. 8 illustrates a flow chart of a data recovery method using the invalid delay queue of FIG. 7.

FIG. 8 illustrates a flow chart of a data recovery method using the invalid delay queue. Referring to FIG. 8, the data recovery method according to an embodiment may include four operations S210 to S240.

In operation S210, a data recovery command may be provided to the file system 120, e.g., by the application 110. The file system 120 transfers a data recovery command to the flash translation layer 130. In operation S220, the flash translation layer 130 determines whether the mapping data corresponding to data to be recovered is registered in the invalid delay queue. In the case that the mapping data corresponding to the data to be recovered is determined to be registered in the invalid delay queue, the procedure goes to operation S230. If the mapping data is not registered in the invalid delay queue, the data recovery is completed, and the data may not be recoverable. In the operation S230, the flash translation layer 130 cancels registration of the mapping data corresponding to the data to be recovered from the invalid delay queue. In operation S240, the file system 120 recovers meta data of the data to be recovered.

By recovering the meta data corresponding to the deleted data by the above described method, the user data may be recovered stably. The order of performing meta data recovery and the renewal of the invalid delay queue may be varied. For example, the invalid delay queue may be renewed after the meta data is first recovered.

In the above embodiment, the invalidation of the mapping data is delayed using the invalid delay queue. However, in the case of an already-invalidated physical sector, the data stored in the physical sector may also be protected by preventing merge and/or erase operations from being performed thereon. In particular, in another embodiment, a merge/erase prevention queue is used to prevent merge and/or erase operations for the invalidated physical sector. The invalidated physical sector may be registered in the merge/erase prevention queue and, while registered in the merge/erase prevention queue, is not merged or erased. Accordingly, the data stored in the physical sector may be maintained for a period of time. The size of the merge/erase prevention queue may be varied according to the particular implementation. For example, if the size of the merge/erase prevention queue is larger, the merge and erase operation of the invalidated physical sector may be delayed for a longer period of time. If the size of the merge/erase prevention queue is smaller, the merge or erase operations of the invalidated physical sector may be delayed for a shorter period of time.

Figure 9:
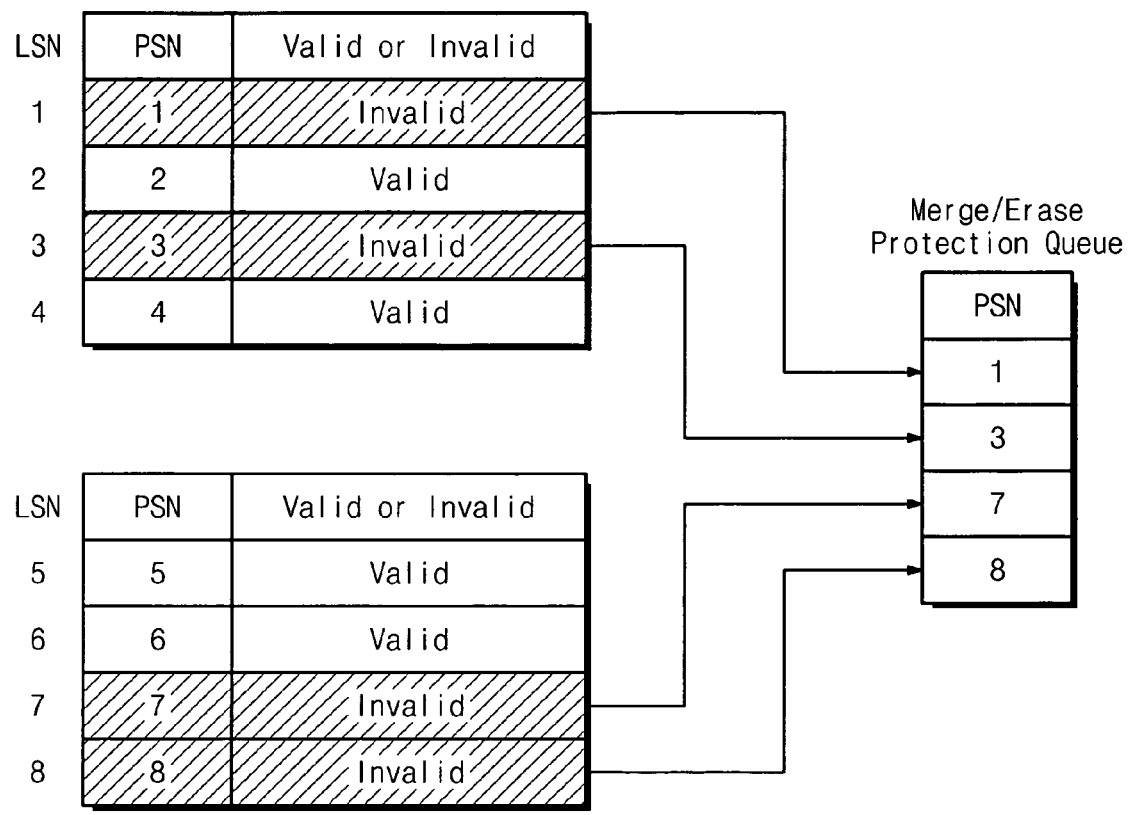
FIG. 9 illustrates a concept map of a management method of a merge/erase prevention queue.

FIG. 9 illustrates a concept map of a management method of the merge/erase prevention queue. Referring to FIG. 9, it is assumed that physical sectors PSN 1, PSN 3, PSN 7, and PSN 8 are invalidated sequentially by a data delete operation in the illustrated example. According to an embodiment, the physical sectors PSN 1, PSN 3, PSN 7, and PSN 8 are not invalidated immediately by a delete operation, but rather are registered in the invalid delay queue. In the illustrated example, the physical sector PSN 1 is registered in the invalid delay queue. Here, the invalid delay queue stores not the data stored in the physical sector PSN 1, but rather the location of the physical sector. The physical sectors PSN 3, PSN 7, and PSN 8 are sequentially registered in the invalid delay queue in the same way as PSN 1.

The flash translation layer 130 does not invalidate physical sectors while they are registered in the invalid delay queue. Accordingly, the physical sectors PSN 1, PSN 3, PSN 7, and PSN 8 are maintained to be valid. When the invalid delay queue is full and another physical sector is to be registered therein, the registration of the first-registered physical sector PSN 1 is cancelled in the FIFO order. The physical sector cancelled from the invalid delay queue is invalidated. The invalidated physical sector is to be merged or erased.

Figure 10:
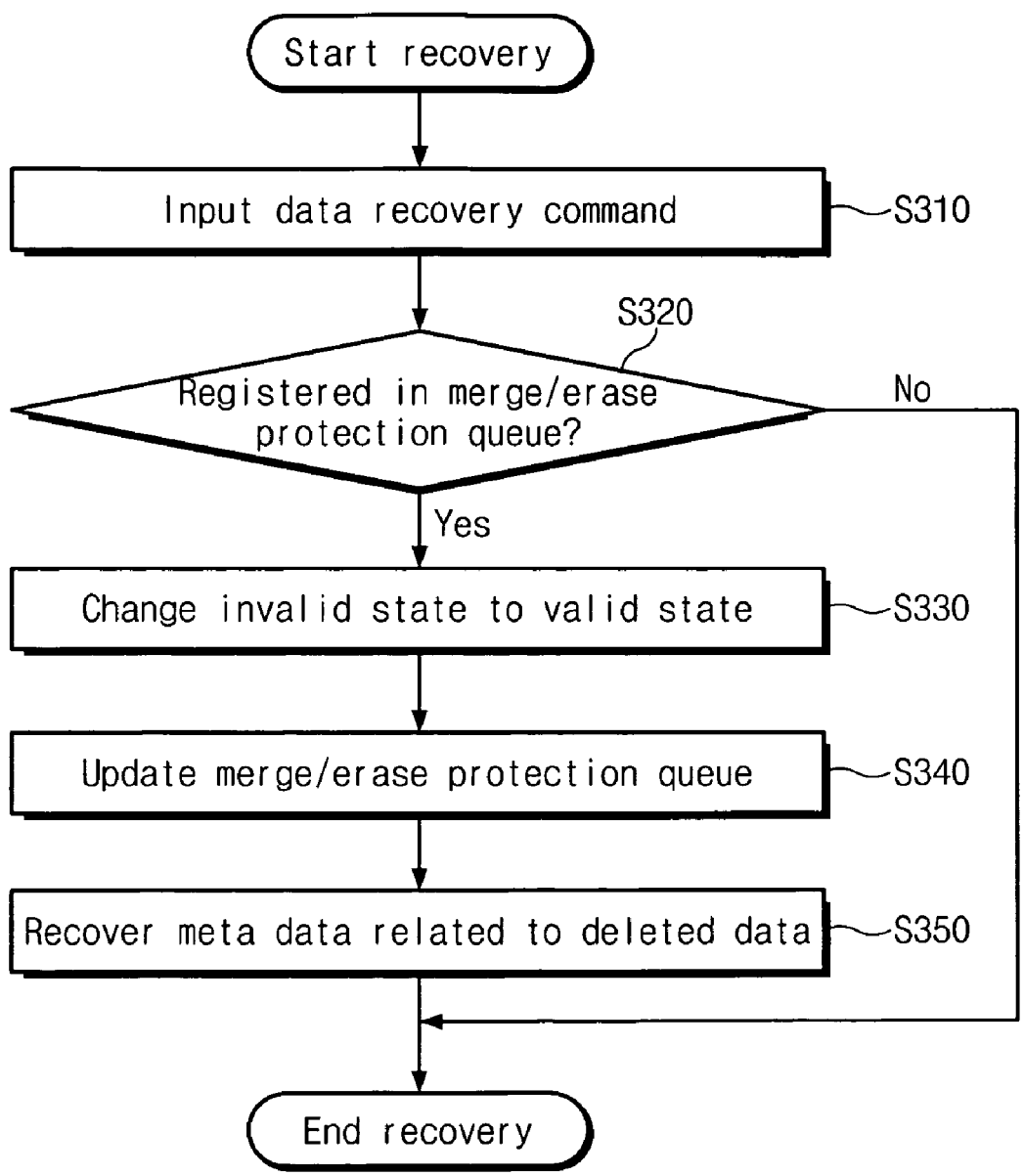
FIG. 10 illustrates a flow chart of a data recovery method using the merge/erase prevention queue of FIG. 9.

FIG. 10 illustrates a flow chart for a data recovery method using the merge/erase prevention queue of FIG. 9. Referring to FIG. 10, the data recovery method may include five operations.

In operation S310, a data recovery command may be input to the file system 120, e.g., from the application 110. The file system 120 may transfer the data recovery command to the flash translation layer 130. In operation S320, the flash translation layer 130 determines whether mapping data corresponding to data to be recovered is registered in the merge/erase prevention queue. If the mapping data corresponding to the data to be recovered is registered in the merge/erase prevention queue, the procedure goes to operation S330. If not registered, a data recovery operation is ended, and the data may not be recoverable.

In the operation S330, the flash translation layer 130 validates the mapping data corresponding to the data to be recovered via the mapping table. In the operation S340, the flash translation layer 130 cancels registration of mapping data corresponding to the data to be recovered from the merge/erase prevention queue. In the operation S350, the file system 120 recovers the deleted meta data of the data to be recovered. By delaying the merge and erase operations of the invalidated physical sector according to the above described method, data loss may be prevented. Accordingly, the user data may be recovered stably.

In another embodiment, the invalidated delay queue and the merge/erase prevention queue may be used together. Initially, the invalidation of mapping data may be delayed by the invalid delay queue. Then, by registering the invalidated physical sector in the merge/erase prevention queue, the merge and/or erase operations for the invalidated physical sector may be delayed.

Figure 11:
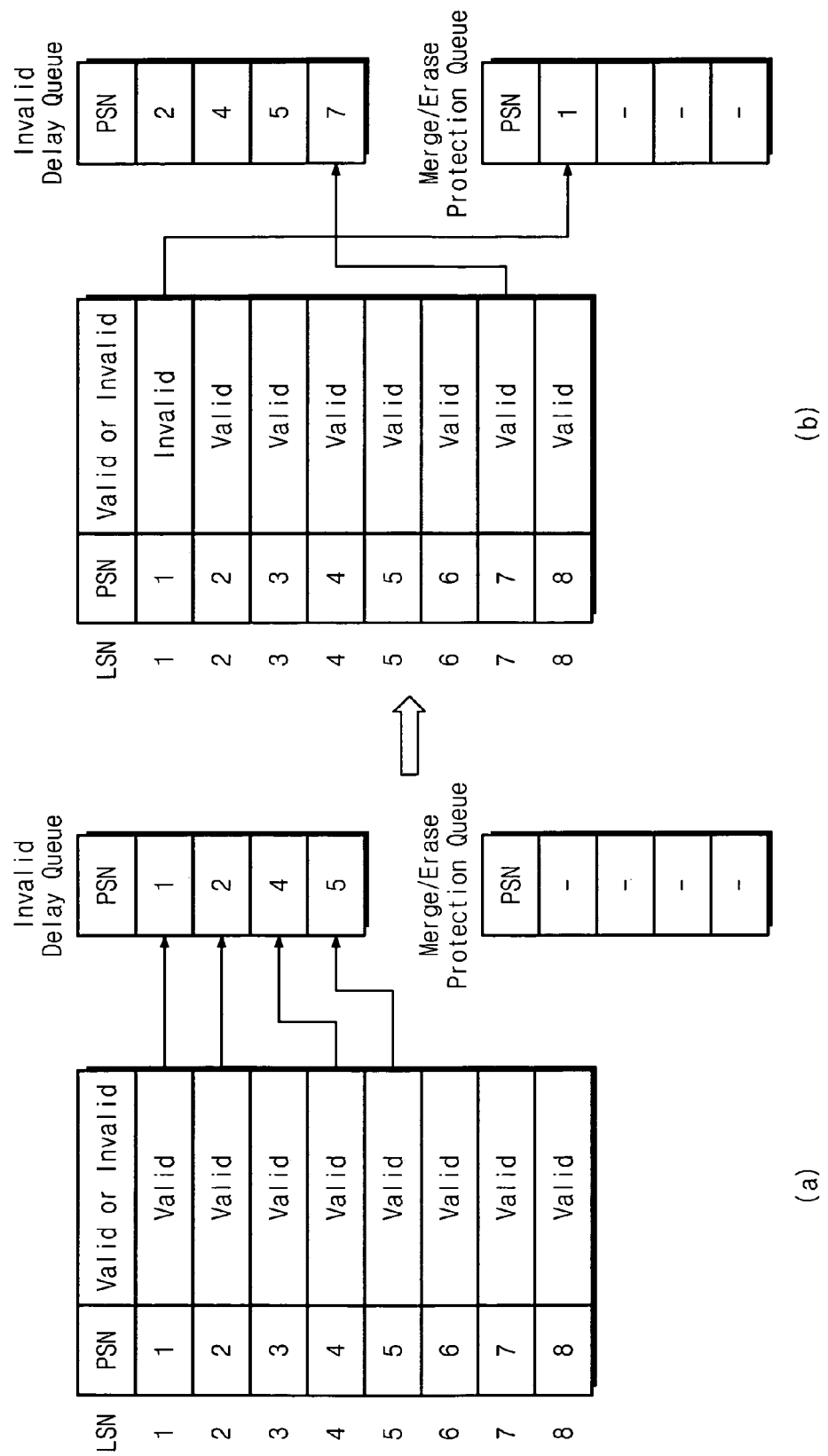
FIGS. 11(a) and 11(b) illustrate concept maps for using an invalidated delay queue and a merge/erase prevention queue together, where

FIG. 11 illustrates a concept map for a managing method in the case that the invalidated delay queue and the merge/erase prevention queue are used together. FIG. 11(a) illustrates the case where only the invalid delay queue is used, and FIG. 11(b) illustrates the case where the invalid delay queue and the merge/erase prevention queue area are used together.

In the present embodiment, mapping data corresponding to data to be deleted is registered in the invalid delay queue in order to delay the invalidation. If the invalid delay queue becomes full and additional mapping data is to be registered therein, the registration of the first-registered physical sector may be cancelled sequentially according to a FIFO order. The mapping data whose registration is cancelled from the invalid delay queue may then be registered in the merge/erase prevention queue. The mapping data registered in the invalid delay queue is not to be merged or erased while registered in the invalid delay queue. Accordingly, the data stored in the physical sector is not lost by merge and/or erase operations for a period of time.

In the example illustrated in FIG. 11(a), physical sectors PSN 1, PSN 2, PSN 4, and PSN 5 are invalidated sequentially. According to an embodiment, the physical sectors may be registered in the invalid delay queue before being invalidated. The physical sectors registered in the invalid delay queue are not invalidated while registered in the invalid delay queue. Here, the merge/erase prevention queue is not used yet.

FIG. 11(b) illustrates the case that the physical sector PSN 7 is registered in the invalid delay queue. If the invalid delay queue becomes full and another physical sector is to be registered therein, the first registered physical sector PSN 1 is canceled according to a FIFO order. The physical sector PSN 1 whose registration is canceled from the invalid delay queue is invalidated. The invalidated physical sector PSN 1 is registered in the merge/erase prevention queue. The physical sector registered in the merge/erase prevention queue is excluded from being merged or erased while registered in the merge/erase prevention queue.

Figure 12:
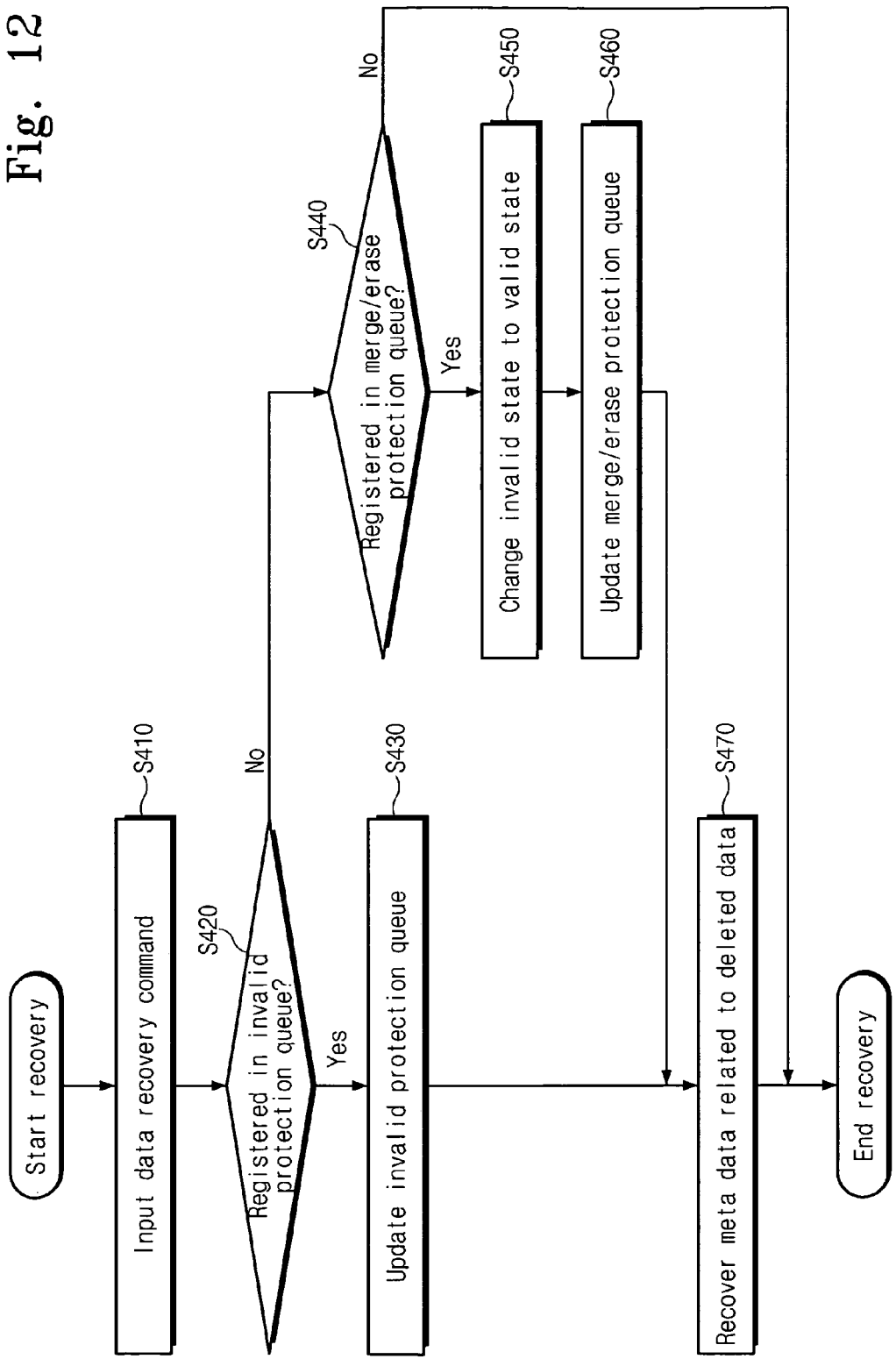
FIG. 12 illustrates a flow chart of a data recovery method using both the invalid delay queue and the merge/erase delay queue of FIG. 11.

FIG. 12 illustrates a flow chart for a data recovery method using both the invalid delay queue and the merge/erase prevention queue. Referring to FIG. 12, the data recovery method according to this embodiment may include seven operations.

In operation S410, a data recovery command is input to the file system 120, e.g., from the application 110. The file system 120 transfers the data recovery command to the flash translation layer 130. In operation S420, the flash translation layer 130 determines whether mapping data corresponding to data to be recovered is registered in the invalid delay queue. In the case that the mapping data corresponding to the data to be recovered is registered in the invalid delay queue, the procedure goes to operation S430. If not registered, the procedure goes to operation S440.

In operation S430, the flash translation layer 130 cancels mapping data corresponding to the data to be recovered from the invalid delay queue. In operation S440, it is determined whether the mapping data corresponding to the data to be recovered is registered in the merge/erase prevention queue. In the case that the mapping data corresponding to the data to be recovered is registered in the merge/erase prevention queue, the procedure goes to operation S450. If not registered a data recovery is ended, and the data may not be recoverable.

In operation S450, the flash translation layer 130 validates the invalidated physical sectors through the mapping table. In operation S460, the flash translation layer 130 cancels mapping data corresponding to the data to be recovered from the merge/erase prevention queue. In operation S470, the file system 120 recovers the deleted meta data of the data to be recovered.

It may be possible to recover data by delaying the invalidation of the block corresponding to the deleted data and by delaying merge and erase operations of the physical sector corresponding to the invalidated data, via the above-described method. Accordingly, data may be recovered stably. In case of a hard disk that is directly controlled by the file system, the erased data may be restored by a recovery command of the file system, except for the cases that the erased data is physically overwritten. However, in case of a flash memory device, the erase operation may be performed by both the file system and the flash translation layer. Cases that data is not recovered at the system level may occur although the data is recoverable at the flash translation layer level. According to embodiments, a semiconductor memory device like a flash memory device using a translation layer may be provided with a data recovery method.

Figure 13:
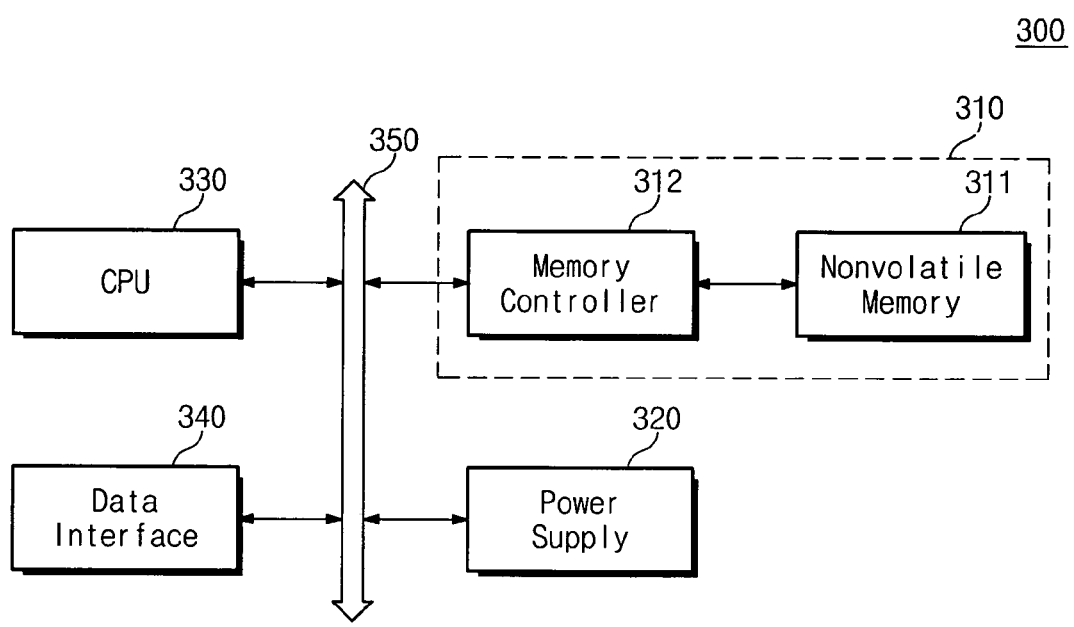
FIG. 13 illustrates a schematic block diagram of a memory system including a semiconductor memory device according to an embodiment.

FIG. 13 illustrates a block diagram of a memory system 300 including a semiconductor memory device according to an embodiment. Referring to FIG. 13, the memory system 300 includes a semiconductor memory device 310 formed of a nonvolatile memory device 311 and a memory controller 312, a CPU 330 electrically connected to a system bus 350, an interface 340 such as a user interface, and a power supplier 320.

Data provided via the interface 340 and/or processed by the CPU 330 may be stored in the non-volatile memory device 311 via the memory controller 312. The semiconductor memory device 310 may be part of a solid state disk/drive (SSD) that supports recovery of deleted data. Solid state drive (SSD) products are becoming popular in the next generation memory market. The SSD products are expected to substitute the hard disk drive (HDD). The SSD is high-speed and is resistant against external impact, compared to the HDD which operates mechanically. The SSD also consumes little power.

The memory system may further include, e.g., an application chipset, camera image sensor (CIS) and/or processor, mobile DRAM, etc. (not shown).

The flash memory and/or the controller according to embodiments may be mounted using various forms of packages. The flash memory and/or the controller may be mounted using packages such as PoP (Package on Package), Ball Grid Arrays (BGAs), Chip Scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), etc.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A semiconductor memory device, comprising:
a nonvolatile memory device having a plurality of physical sectors; and a memory controller comprising a mapping table and a storage queue, and configured to translate a logical address of a data delete command received from a host to a physical address, with reference to mapping data of the mapping table that defines a correspondence between the logical address and the physical address, wherein:

the nonvolatile memory device is configured to execute an erase operation or a merge operation for a first physical sector corresponding to the physical address from the memory controller, and the memory controller is further configured to register the mapping data corresponding to the data delete command in the storage queue, and to delay the execution of the erase operation or the merge operation in accordance with the registered mapping data in the storage queue.

2. The semiconductor memory device as claimed in claim 1, wherein;

the memory controller delays the execution of erase or merge operation for the first physical sector in which a first data is stored by registering mapping data corresponding to the first data in the storage queue, and the memory controller prevents invalidation of the mapping data corresponding to the first data while the mapping data corresponding to the first data is registered in the storage queue.

3. The semiconductor memory device as claimed in claim 2, wherein, when a data recovery command instructs the memory controller to attempt to recover the first data, the memory controller cancels registration of the mapping data corresponding to the first data from the storage queue.

4. The semiconductor memory device as claimed in claim 3, wherein:

the storage queue is a first-in-first-out (FIFO) buffer, and the memory controller recovers the first data while the mapping data corresponding to the first data is registered in the FIFO buffer.

5. The semiconductor memory device as claimed in claim 1, wherein:

the memory controller delays the execution of the erase or merge operation for the first physical sector in which the first data is stored by registering invalidated mapping data corresponding to the first data in the storage queue, and the memory controller prevents execution of the merge operation or erase operation for the first physical sector in which the first data is stored while the invalidated mapping data corresponding to the first data is registered in the storage queue.

6. The semiconductor memory device as claimed in claim 5, wherein, when a data recovery command instructs the memory controller to attempt to recover the first data while the invalidated mapping data corresponding to the first data is registered in the storage queue, the memory controller validates the invalidated mapping data corresponding to the first data.

7. The semiconductor memory device as claimed in claim 6, wherein, when the data recovery command instructs the memory controller to attempt to recover the first data while the invalidated mapping data corresponding to the first data is registered in the storage queue, the memory controller also cancels registration of the invalidated mapping data corresponding to the first data from the storage queue.

8. The semiconductor memory device as claimed in claim 5, wherein the storage queue is a first-in-first-out (FIFO) buffer.

9. The semiconductor memory device as claimed in claim 1, wherein:

the storage queue comprises:
a first queue configured to register mapping data corresponding to the first data; and
a second queue configured to register invalidated mapping data corresponding to the first data, the memory controller prevents invalidation of the mapping data corresponding to the first data while the mapping data corresponding to the first data is registered in the first queue, and the memory controller prevents the merge operation and prevents the erase operation for a first physical sector in which the first data is stored while the invalidated mapping data corresponding to the first data is registered in the second queue.

10. The semiconductor memory device as claimed in claim 9, wherein, when a data recovery command instructs the memory controller to attempt to recover data, the memory controller detects whether the mapping data corresponding to the first data is registered in the first queue or detects whether the invalidated mapping data corresponding to the first data is registered in the second queue.

11. The semiconductor memory device as claimed in claim 10, wherein, when the memory controller detects mapping data corresponding to the first data in the first queue in response to the data recovery command, the memory controller cancels registration of the mapping data corresponding to the first data from the first queue.

12. The semiconductor memory device as claimed in claim 11, wherein the first queue is a first-in-first-out (FIFO) buffer.

13. The semiconductor memory device as claimed in claim 10, wherein, when the memory controller detects invalidated mapping data corresponding to the first data in the second queue in response to the data recovery command, the memory controller validates the invalidated mapping data corresponding to the first data to be recovered.

14. The semiconductor memory device as claimed in claim 13, wherein, when the memory controller detects invalidated mapping data corresponding to the first data in the second queue in response to the data recovery command, the memory controller also cancels registration of the mapping data corresponding to the first data from the second queue.

15. The semiconductor memory device as claimed in claim 14, wherein the second queue is a first-in-first-out (FIFO) buffer.

16. A method of managing data for a semiconductor memory device having a nonvolatile memory device with a plurality of physical sectors and a memory controller, the method comprising:

translating a logical address into a physical address in the memory controller, with reference to mapping data that defines a correspondence between the logical address and the physical address;

accessing in the nonvolatile memory device a first physical sector corresponding to the physical address;

receiving a data delete command provided from a host to the memory controller to delete first data that is stored in the first physical sector; and using the memory controller to register the data delete command in a storage queue and to delay the execution of the erase or merge operation for the first physical sector in which the first data is stored.

17. The method as claimed in claim 16, wherein delaying execution of the erase or merge operation includes:

registering mapping data corresponding to the first data in the storage queue, and preventing invalidation of the mapping data corresponding to the first data while the mapping data corresponding to the first data is registered in the storage queue.

18. The method as claimed in claim 17, further comprising cancelling registration of the mapping data corresponding to the first data from the storage queue when a data recovery command instructs the memory controller to attempt to recover the first data.

19. The method as claimed in claim 16, further comprising invalidating mapping data corresponding to the first data in response to the data delete command,
- wherein delaying execution of the erase or merge operation includes:
  - registering the invalidated mapping data corresponding to the first data in the storage queue, and
  - preventing the merge operation and preventing the erase operation for the first physical sector in which the first data is stored while the invalidated mapping data corresponding to the first data is registered in the storage queue.

20. The method as claimed in claim 19, further comprising:
- receiving a data recovery command from the host while the invalidated mapping data corresponding to the first data is registered in the storage queue, and then:
  - validating the invalidated mapping data corresponding to the first data, and
  - cancelling registration of the invalidated mapping data corresponding to the first data from the storage queue.

21. A memory system, comprising:
- an interface configured to transfer data to and from the memory system;
- a CPU configured to process data in the memory system; and
- a semiconductor memory device configured to store the data, wherein the semiconductor memory device includes:
  - a nonvolatile memory device having a plurality of physical sectors; and
  - a memory controller comprising a mapping table and a storage queue, and configured to translate a logical address received of a data delete command from the CPU to a physical address, with reference to mapping data of the mapping table that defines a correspondence between the logical address and the physical address, wherein:
  - the nonvolatile memory device is configured to execute an erase operation or a merge operation for a first physical sector corresponding to the physical address so as to delete first data stored in the first physical sector, and
  - the memory controller is further configured to register the data delete command received from the CPU in the storage queue, and to delay the execution of the erase operation or the merge operation.

* * * * *